United States Patent [19]
Mumma

[11] 3,752,516
[45] Aug. 14, 1973

[54] KNOT TYING JIG

[76] Inventor: Paul R. Mumma, 2920 Hastings Rd., Cuyahoga Falls, Ohio 44224

[22] Filed: Dec. 7, 1971

[21] Appl. No.: 205,513

[52] U.S. Cl. ................................................ 289/17
[51] Int. Cl. ............................................ D03j 3/00
[58] Field of Search ...................................... 289/17

[56] References Cited
UNITED STATES PATENTS

| 3,106,417 | 10/1963 | Clow | 289/17 |
| 3,131,957 | 5/1964 | Musto | 289/17 |
| 3,177,021 | 4/1965 | Benham | 289/17 |
| 3,402,957 | 9/1968 | Peterson | 289/17 |

Primary Examiner—Louis K. Rimrodt
Attorney—Vern L. Oldham et al.

[57] ABSTRACT

A jig to aid in tying a knot in a line or cord, for example for knotting a fishing line onto a connector means or a hook. The jig is a hollow tubular member with the ends cut at 45° angles and provided with a notch in the cut end and a hole adjacent the notch. In use, the line is laid along the side of the jig, passed through the eye of the fish hook or connector which preferably is laid in the notch, wrapped in several loops, usually three, around the jig and has the end of the line threaded through the hole. When the jig is cleared by slipping the loops off of it, the end of the line is pulled through the convolutions and the ends of the line can then be drawn tight to complete the knot.

5 Claims, 3 Drawing Figures

PATENTED AUG 14 1973 3,752,516

INVENTOR.
PAUL R. MUMMA
BY
Oldham & Oldham
ATTORNEYS

KNOT TYING JIG

The present invention relates to a knot tying jig and more particularly to an uncomplicated positive functioning jig for use by fishermen in tying knots in a fishing line.

A wide variety of knot tying jigs have been proposed heretofore, These earlier jigs, however, have not found wide acceptance. Various ones of these prior jigs are of complex construction, making the jig unduly expensive. Others are difficult to use or do not reliably form a knot.

It is the primary or ultimate object of the present invention to provide a knot tying jig which is of simple construction and which is easily used to form an effective fisherman's knot.

It is also an object of the present invention to provide a knot tying jig which is small enough to be easily carried in the user's pocket and which is inexpensive to make.

A further object of the present invention is the provision of a knot tying jig which permits the rapid forming of a secure knot and which assures uniform quality for each knot made with the jig.

The above and other objects of the invention which will become apparent in the following detailed description are achieved by providing a knot tying jig which consists of a hollow cylindrical tubular member which has at least one end cut at a 45° angle, a slot formed at the cut end of the tube, and a hole through the projecting portion of the cut end.

For a more complete understanding of the invention and the objects and advantages thereof, reference should be had to the following detailed description and the accompanying drawings wherein there is shown a preferred embodiment of the invention.

Figure 1:
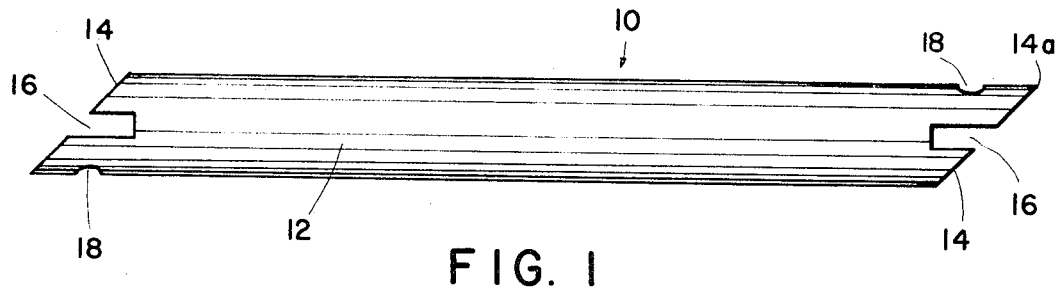
FIG. 1 is a side elevation view of the knot tying jig of the present invention.

The jig, which is designated generally by the reference numeral 10, preferably is formed of a hollow cylindrical tube 12. One or both ends of the tube are cut at about 45° angles to provide slanted ends 14. A typical tube would be about five inches in length, have an external diameter of about ¼ inch and a wall thickness of about 1/32 inch.

The slanted end or ends of the tube 12 are provided with notches 16 located as is shown in FIG. 1; that is, on the center line of the tube 12 and extending transversely across the slanted ends 14. In a typical jig, the notch has a height of about 1/16 inch and extends about ¼ inch from the pointed end 14a of the tube 12. A hole 18 is provided in the projecting end of the tube. This hole may, for example, be about ⅛ inch in diameter and have its center located about ⅛ inch inwardly from the pointed end 14a of the tube 12.

Figure 2:
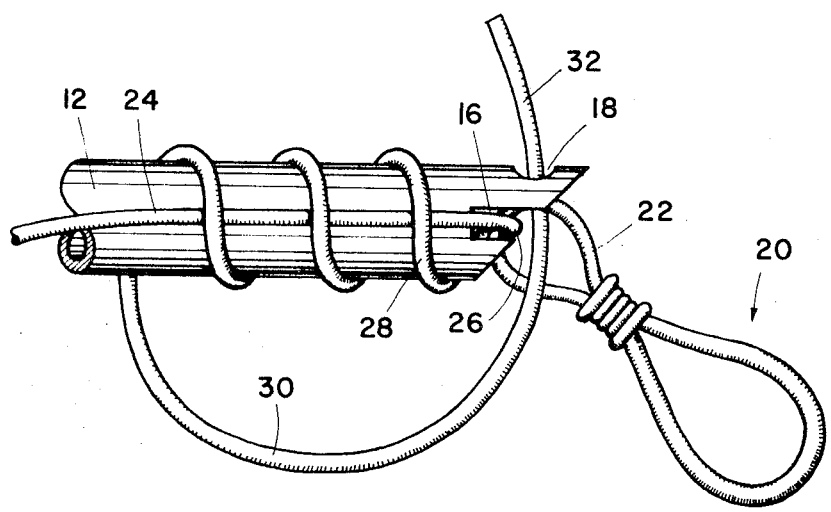
FIG. 2 is an enlarged fragmentary elevational view showing the use of the jig in forming a knot.
Figure 3:
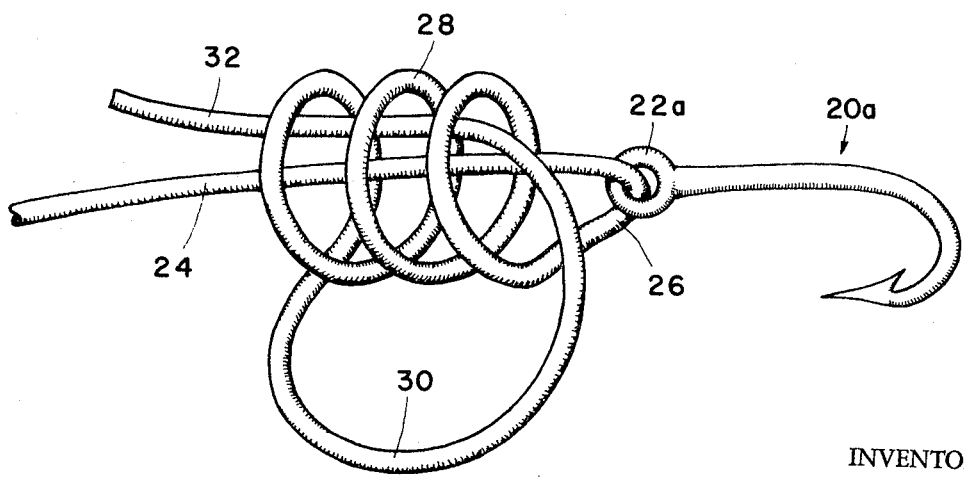
FIG. 3 is an elevational view showing a knot formed with the jig of the present invention, the knot being shown prior to tightening the convolutions thereof.

The manner of using the jig 10 to tie an effective fisherman's knot is illustrated in FIGS. 2 and 3. The line or cord 24 is first laid along one side of the body 12 and passes through the eye 22 of the swivel 20 or hook 20a, as indicated at 26. Preferably the end 22 of the swivel 20 is placed in the slot 16 before the knot is tied. The line is then wrapped in several convolutions 28 around the body 12 and the straight portion 24 of the line. Preferably, at least three convolutions 28 are provided. The free end 30 of the line is then passed upwardly through the hole 18 with a length 32 of line projecting above the hole. The jig 10 is now pulled out of the convolutions by lightly holding the convolutions and pulling them to the right, in FIG. 2. Since the end of the cord or line 32 is retained by the hole 18, this end is pulled through the convolutions. The resulting knot is illustrated in FIG. 3. The cord portions 24 and 32 are now pulled tight to draw the loop 30 through the convolutions 28 and to pull the convolutions tightly around the cord portions 24 and 32 thereby forming a secure knot. The free end 32 of the cord may now be cut to the desired length.

It will be noted that the jig may be easily held in one hand of the user and that the user may employ his thumb and forefinger to hold the cord 24 and the convolutions 28 in place until the jig has been removed. The simple design of the jig makes its use easy and permits the jig to be inexpensively manufactured. Since no complex threading operations are required in using the jig, uniform and reliable knots can easily be formed. The compact nature of the jig makes it easy to carry in the user's pocket.

While only the best known embodiment of the invention has been illustrated and described in detail herein, the invention is not limited thereto or thereby. Reference should therefore be had to the appended claims in determining the true scope of the invention.

What is claimed is:

1. A knot tying jig comprising an elongated member having an end formed at an angle of about 45° to the longitudinal axis of the member, said member having a hole formed in its overhanging end portion for receiving and retaining the end of a line to facilitate pulling the end of the line through convolutions formed on the jig when the convolutions are drawn off of the member thereby the line is positioned within the convolutions.

2. A knot tying jig as in claim 1 where a slot is formed in said end of said member to receive a means including a loop therein whereby the line end can be threaded through the loop before being wound around the member to form convolutions of the line.

3. A knot tying jig as in claim 2 where the line is held against said member and the line end is threaded through said loop and wound around said member and then threaded through said hole before the convolutions are pulled off of said member.

4. A knot tying jig as in claim 1 where said member is a tube.

5. A knot tying jig as in claim 4 where duplicate slanted and apertured ends are formed on said member.

* * * * *